(No Model.)

L. MEEKER.
LIFTING JACK.

No. 454,441. Patented June 16, 1891.

WITNESSES
A. J. Schwartz
J. Fred Reity

Lorenzo Meeker,
INVENTOR:
By W. T. Fitzgerald & Co.
Attorneys.

UNITED STATES PATENT OFFICE.

LORENZO MEEKER, OF CHICAGO, ILLINOIS, ASSIGNOR TO THE UNION MANUFACTURING AND PLATING COMPANY, OF SAME PLACE.

LIFTING-JACK.

SPECIFICATION forming part of Letters Patent No. 454,441, dated June 16, 1891.

Application filed September 5, 1890. Serial No. 363,971. (No model.)

*To all whom it may concern:*

Be it known that I, LORENZO MEEKER, a citizen of the United States, residing at Chicago, in the county of Cook and State of Illinois, have invented certain new and useful Improvements in Lifting-Jacks; and I do hereby declare the following to be a full, clear, and exact description of the invention, such as will enable others skilled in the art to which it appertains to make and use the same.

My invention relates to improvements in lifting-jacks; and it consists of certain details of construction, which will be fully described in the following specification and accompanying drawings, and pointed out in the claim.

Figure 1:
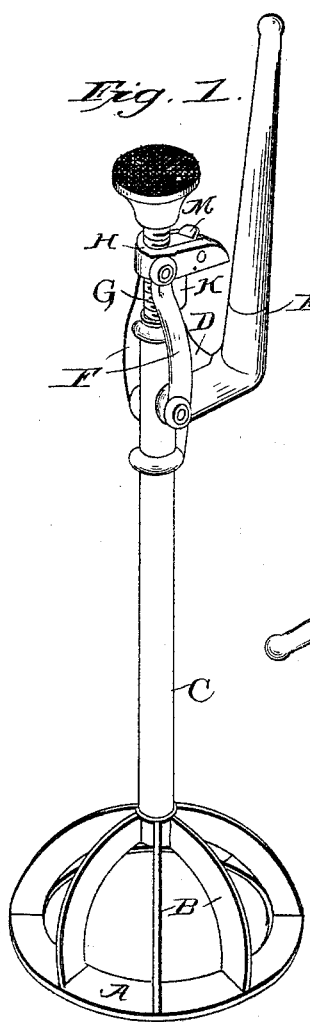
Figure 3:
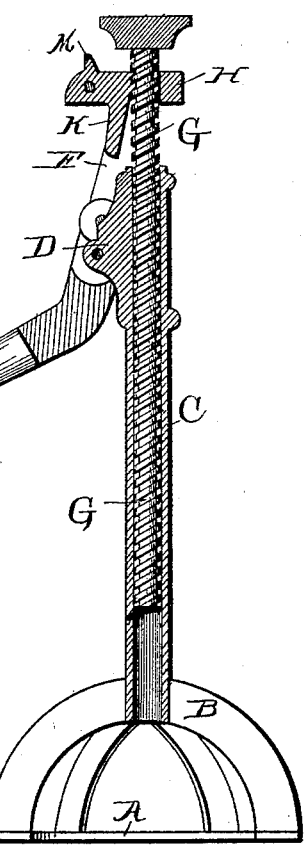
Figure 2:
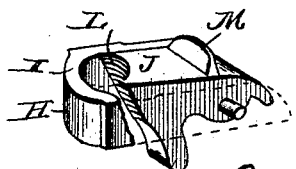

Referring to the drawings, Figure 1 is a perspective view of my improved lifting-jack. Fig. 2 is a detail of the clutch or trigger. Fig. 3 is a longitudinal section of Fig. 1.

In developing my invention I mount upon a suitable base of any preferred shape—preferably formed, as shown, with the base-plate proper A, having a series of upwardly-converging arms B upon the upper side of said base—a hollow tubular guide or standard C, while upon the upper ends of said standard I provide the lateral projection or boss D, to which the operating-lever E is fulcrumed. Said operating-lever is preferably formed bifurcated, so that one of its ends will reach upon either side of the standard, that the lever may be pivotally secured to the said projection at a point near the junction of said bifurcated ends.

The lifting-bar G consists, preferably, of a cylindrical piece of metal provided its entire length with a screw-threaded surface and terminating at its upper end in an enlarged cap or head, the upper surface of which is properly roughened or corrugated, so that it will more readily hold or adhere to the object lifted. The screw-threaded surface of the lifting-bar may be replaced by annular corrugations, if preferred.

The clutch H is mounted around the lifting-bar and consists of the U-shaped member or body I, the upper and the inner edge of the bended portion being adapted to fit closely or impinge against the lifting-bar when said bar is pressed against said portion in lifting the load, as will be hereinafter described. Between the free ends of the U-shaped member is pivotally secured the dog or trigger J, the upper and inner face of which is transversely corrugated, as shown at L, so that it will readily adhere to the lifting-bar and tightly impinge thereon when the load is raised. The dog or trigger is provided on its under side between its pivot and its inner end with the depending lug or handle K, which inclines slightly outward from the lifting-bar. When said handle is pressed inward against the lifting-bar, it will cause the dog to move pivotally, thus withdrawing the face of said dog away from or out of contact with the lifting-bar, and thus permit said bar to be freely raised or lowered. It will be seen that the lifting-bar can be easily adjusted to the varying heights of the load to be lifted.

The bifurcated ends of the lever are pivotally connected to said clutch by means of the links F, which rise from either arm of the lever to diametrically-opposite sides of the lifting-bar, where they are secured at opposite sides of the clutch. Upon the upper side of the dog I provide the handle or upwardly-reaching lug M, which may also be used to withdraw the upper impinging edge of the dog away from contact with the lifting-bar.

In operating the device the lifting-bar is raised until the upper end bears against the under side of the weight to be lifted, when the dog will automatically secure the bar in such position. By then lowering the free end of the lever the lifting-bar will be elevated, thereby lifting the weight. The weight is then secured in such raised position in any preferred way, when the free end of the lever is again elevated, thus lowering the lifting-bar. The lifting-bar is then withdrawn from the standard until its upper end again touches the weight, when the operation of the lever is repeated until the weight is raised to the desired height. In order to again lower the lifting-bar within the standard the handle K is pressed inward against said bar, when the inner or contacting face of the dog will be withdrawn, and thus permit the bar to be freely lowered.

It will be observed that my lifting-jack is very simple in its construction and efficient in its operation and that it is strong, cheaply made, and durable. The essential feature of the present invention is the construction of the clutch holding the lifting-bar. It will be seen that the dog consists of but one piece of metal, so constructed and mounted between the ends of the U-shaped yoke that the bar will be readily and efficiently held in a raised position, and that the dog may be so manipulated that the lifting-bar may be lifted freely upward or dropped downward within the clutch and standard.

Having thus described my invention, what I claim, and desire to secure by Letters Patent, is—

The combination, in a lifting-jack, of the tubular vertical standard or guide C, mounted at its lower end on the base-support A B and formed on one side of its upper end with the boss D, the operating-lever E, having the bifurcated inner end fulcrumed on the boss D, the threaded lifting-bar G, fitting movably in the hollow standard, the connecting-links F F, the U-shaped body I, pivotally secured between the upper ends of the links F, and the locking-dog J, pivotally secured between the outer ends of the U-shaped body I, having its inner upper face transversely corrugated and formed on its under side with the downwardly and outwardly inclined handle K and upon its upper side with the operating-lug M, substantially as and for the purpose set forth.

In testimony whereof I affix my signature in presence of two witnesses.

LORENZO MEEKER.

Witnesses:
W. T. FITZ GERALD,
A. E. GRANT.